US012645660B1

(12) United States Patent
Baranwal et al.

(10) Patent No.: US 12,645,660 B1
(45) Date of Patent: Jun. 2, 2026

(54) USER ENGAGEMENT REGULATION SYSTEM AND METHOD

(71) Applicant: MoEngage Inc., San Francisco, CA (US)

(72) Inventors: Mohit Baranwal, Bangalore (IN); Paramveer Singh, Meerut (IN); Ajish Nair, Pune (IN)

(73) Assignee: MOENGAGE INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 19/339,557

(22) Filed: Sep. 25, 2025

(30) Foreign Application Priority Data

Aug. 5, 2025　(IN) .............................. 202521074551

(51) Int. Cl.
　*G06F 16/00*　　　(2019.01)
　*G06F 16/22*　　　(2019.01)
　*G06Q 30/0272*　　(2023.01)

(52) U.S. Cl.
　CPC ..... *G06F 16/2255* (2019.01); *G06Q 30/0272* (2013.01)

(58) Field of Classification Search
　CPC ........................ G06F 16/2255; G06Q 30/0272
　See application file for complete search history.

(56) References Cited

U.S. PATENT DOCUMENTS

2014/0074603 A1 * 3/2014 van Elsas .......... G06Q 30/0246
　　　　　　　　　　　　　　　　　　　705/14.66
2015/0281452 A1 * 10/2015 Bohlin .................... H04M 3/51
　　　　　　　　　　　　　　　　　　　379/266.07

2020/0137008 A1 * 4/2020 Jin ........................ H04L 51/214
2020/0322307 A1 * 10/2020 Zhang ................ G06Q 30/0242
(Continued)

FOREIGN PATENT DOCUMENTS

CN　　113129056 A 　* 7/2021 ............. G06F 18/22
CN　　115633010 A 　　1/2023
CN　　116897364 A 　* 10/2023 ......... H04L 63/0414
(Continued)

OTHER PUBLICATIONS

Iordanou et al., "Beyond content analysis: Detecting targeted ads via distributed counting",2019,ACM Digital Library,pp. 110-122 (Year: 2019).*

*Primary Examiner* — Charles Rones

(74) *Attorney, Agent, or Firm* — Jason A. Smith; Shumaker, Loop & Kendrick, LLP

(57) ABSTRACT

A computer-implemented method for regulating delivery frequency of outbound communications. The method includes receiving message context data comprising one or more of a user identifier, a client identifier, a campaign identifier, a channel identifier, a label identifier, and a trigger identifier. A counter-field identifier is determined that encodes the channel identifier, label identifier, trigger identifier, campaign identifier, and a temporal-interval indicator. A counter field identified by the counter-field identifier is created. A value stored in the counter field is incremented through an atomic operation. The value is compared with a limit stored in a rule set. An allow signal is output when the value does not exceed the limit and a suppress signal is output when the value exceeds the limit. An engagement-counter record is updated to the in-memory database.

16 Claims, 7 Drawing Sheets

(56)　　　　　References Cited

U.S. PATENT DOCUMENTS

2023/0005023 A1 *　1/2023　Zhang ............... G06Q 30/0272
2024/0046313 A1 *　2/2024　Manrique ............. G06Q 30/08

FOREIGN PATENT DOCUMENTS

DE　　　102015014045 B3 *　4/2017　............. H04H 60/65
JP　　　　2023171288 A　*　12/2023　......... G06Q 30/0272
WO　　WO-2005079499 A2 *　9/2005　............. H04H 60/63
WO　　WO-2024076703 A1 *　4/2024　......... G06Q 30/0222

* cited by examiner

300

302 — Receive message context data

304 — Determine counter-field identifier

306 — Create counter field

308 — Increment value in counter field

310 — Does value exceed limit?

Yes

No

312 — Output suppress signal

314 — Output allow signal

316 — Update engagement-counter record

500

502 — Determine timezone for user

504 — Compute calendar-day window

506 — Assign window as temporal applicability property

508 — Calculate expiration interval

510 — Assign expiration interval to record

USER ENGAGEMENT REGULATION SYSTEM AND METHOD

PRIORITY INFORMATION

The present application does claim a priority from Indian Patent Application number 202521074551 dated Aug. 5, 2025.

TECHNICAL FIELD

The present disclosure relates to user engagement systems, and more particularly to a method and system for regulating the frequency of outbound communications to users across multiple communication channels and campaign types.

BACKGROUND

In recent years, digital communication platforms have faced significant technical challenges in regulating the delivery frequency of outbound communications across multiple channels and campaign types. As the volume and variety of digital messaging have increased exponentially, technical systems struggle to efficiently process, track, and control the flow of communications to prevent overwhelming recipients while maintaining effective engagement. This technical problem is particularly acute in distributed computing environments where multiple services generate outbound messages concurrently, creating race conditions and data consistency issues when attempting to enforce frequency limits.

Current technical approaches to solving this problem typically rely on database-driven rule engines that store and evaluate message delivery history against predefined thresholds. These systems often implement basic locking mechanisms or transaction-based approaches to prevent concurrent updates from creating inconsistent frequency counts. Some solutions utilize separate data stores for each communication channel, while others employ centralized repositories with complex query patterns to aggregate cross-channel messaging data. Additionally, existing implementations may use scheduled batch processing to analyze communication patterns and apply frequency rules retrospectively rather than in real-time.

However, these current technical solutions suffer from several critical limitations. First, they often experience performance degradation under high-concurrency scenarios due to database locking and transaction overhead, creating bottlenecks in message delivery pipelines. Second, existing systems typically lack atomic counter operations, leading to race conditions when multiple services attempt to increment frequency counters simultaneously. Third, current implementations struggle with efficient memory utilization, often storing redundant data structures that consume excessive resources in high-scale environments. Fourth, these systems generally fail to provide real-time decision capabilities with consistent performance characteristics across varying load conditions. These technical shortcomings necessitate a more efficient, scalable approach to regulating outbound communication frequency that can operate reliably in distributed, high-throughput messaging environments.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for regulating delivery frequency of outbound communications. This summary is not intended to identify essential features of the claimed subject matter nor is it intended for use in determining or limiting the scope of the claimed subject matter.

According to an aspect of the present disclosure, a computer-implemented method for hierarchical notification delivery using an in-memory database optimized for high-concurrency operations is provided. The method includes receiving, by at least one processor, message context data comprising one or more of a user identifier, a client identifier, a campaign identifier, a channel identifier, a label identifier, and a trigger identifier. The method further includes deriving, by the at least one processor, (i) a hash key based on the user identifier, the client identifier, and the channel identifier and (ii) a counter-field identifier that encodes the label identifier, the trigger identifier, the campaign identifier, and a temporal-interval indicator. When the hash key is absent from the in-memory database, the method includes creating an engagement-counter record keyed by the hash key and initializing a counter field identified by the counter-field identifier within the engagement-counter record. The method also includes incrementing, by an atomic operation directed to the in-memory database, a value stored in the counter field, comparing the value with a limit stored in a rule set, and outputting an allow signal when the value does not exceed the limit and outputting a suppress signal when the value exceeds the limit. Additionally, the method includes updating the engagement-counter record in the in-memory database to reflect the incremented value or, when the suppress signal is output, a rolled-back value.

According to other aspects of the present disclosure, the method may include one or more of the following features. The method may include, prior to the incrementing, applying global-channel comparison, channel-specific comparison, label-level comparison, and trigger-level comparison in descending order of breadth, and selecting, as the comparison used for the comparing, a comparison at which the limit is exceeded. The method may include determining a timezone associated with the user identifier, computing a calendar-day window based on the timezone, assigning the calendar-day window as a temporal applicability property of the hash key corresponding to the engagement-counter record, and assigning an expiration interval to the engagement-counter record equal to a duration between a system time and the end of the calendar-day window in the timezone. In an example and not by way of any limitation, the in-memory database may be a Redis data store and the incrementing may comprise adding one to the value stored in the counter field by executing an atomic hash-field increment operation within a Redis pipeline that batches multiple operations into a single network round trip, thereby avoiding race conditions during concurrent requests. The in-memory database may implement a hash data structure in which each counter field is a hash field and each engagement-counter record is a hash key. The method may include decrementing the value stored in the counter field upon receipt of a delivery-failure notification associated with the message context data. Receiving the message context data may further comprise retrieving, from the in-memory database, the engagement-counter record keyed by the user identifier, the client identifier, and the channel identifier. The method may include adjusting the limit responsive to receipt of a rule-update request and applying the adjusted limit during the retrieval of the engagement-counter record following the rule-update request.

According to another aspect of the present disclosure, a system for hierarchical notification delivery using an in-memory database optimized for high-concurrency operations is provided. The system includes a communication interface configured to receive message-context data comprising a user identifier, a client identifier, a campaign identifier, a channel identifier, a label identifier, and a trigger identifier. The system also includes an in-memory database that stores engagement-counter records as hash structures addressable by hash keys, a rule store that maintains frequency-capping limits associated with counter-field identifiers, and at least one processor coupled to a memory that stores executable instructions. When executed by the at least one processor, the instructions cause the system to derive a hash key from the user identifier, the client identifier, and the channel identifier, derive a counter-field identifier that encodes the label identifier, the trigger identifier, the campaign identifier, and a temporal-interval indicator, and when the hash key is absent from the in-memory database, create an engagement-counter record keyed by the hash key and initialize a counter field identified by the counter-field identifier within the engagement-counter record. The instructions further cause the system to atomically increment a value stored in the counter field within the in-memory database, retrieve, from the rule store, a limit associated with the counter-field identifier and compare the incremented value with the limit, output an allow signal when the incremented value does not exceed the limit and output a suppress signal when the incremented value exceeds the limit, and update the engagement-counter record in the in-memory database to reflect the incremented value or, when the suppress signal is output, a rolled-back value.

According to other aspects of the present disclosure, the system may include one or more of the following features. The instructions, when executed by the at least one processor, may further cause the system to, prior to the incrementing the value, apply a global-channel comparison, channel-specific comparison, label-level comparison, and trigger-level comparison in descending order of breadth, and select, as the comparison used for the comparing, a comparison at which the limit is exceeded. The instructions may cause the system to determine a timezone associated with the user identifier, compute a calendar-day window based on the timezone, assign the calendar-day window as a temporal applicability property of the hash key corresponding to the engagement-counter record, and assign an expiration interval to the engagement-counter record equal to a duration between a system time and the end of the calendar-day window in the timezone. The in-memory database may be a Redis data store and the incrementing may comprise adding one to the value stored in the counter field by executing an atomic hash-field increment operation within a Redis pipeline that batches multiple operations into a single network round trip, thereby avoiding race conditions during concurrent requests. The in-memory database may implement a hash data structure in which each counter field is a hash field and each engagement-counter record is a hash key. The instructions may cause the system to decrement the value stored in the counter field upon receipt of a delivery-failure notification associated with the message context data.

Receiving the message context data may further comprise retrieving, from the in-memory database, the engagement-counter record keyed by the user identifier, the client identifier, and the channel identifier. The instructions may cause the system to adjust the limit responsive to receipt of a rule-update request and apply the adjusted limit during the retrieval of the engagement-counter record following the rule-update request.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for regulating delivery frequency of outbound communications disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
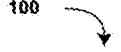
FIG. 1 illustrates a block diagram of a User Engagement Regulation System, showing the relationships between various components including a Server, Client, and User Devices.
Figure 1:
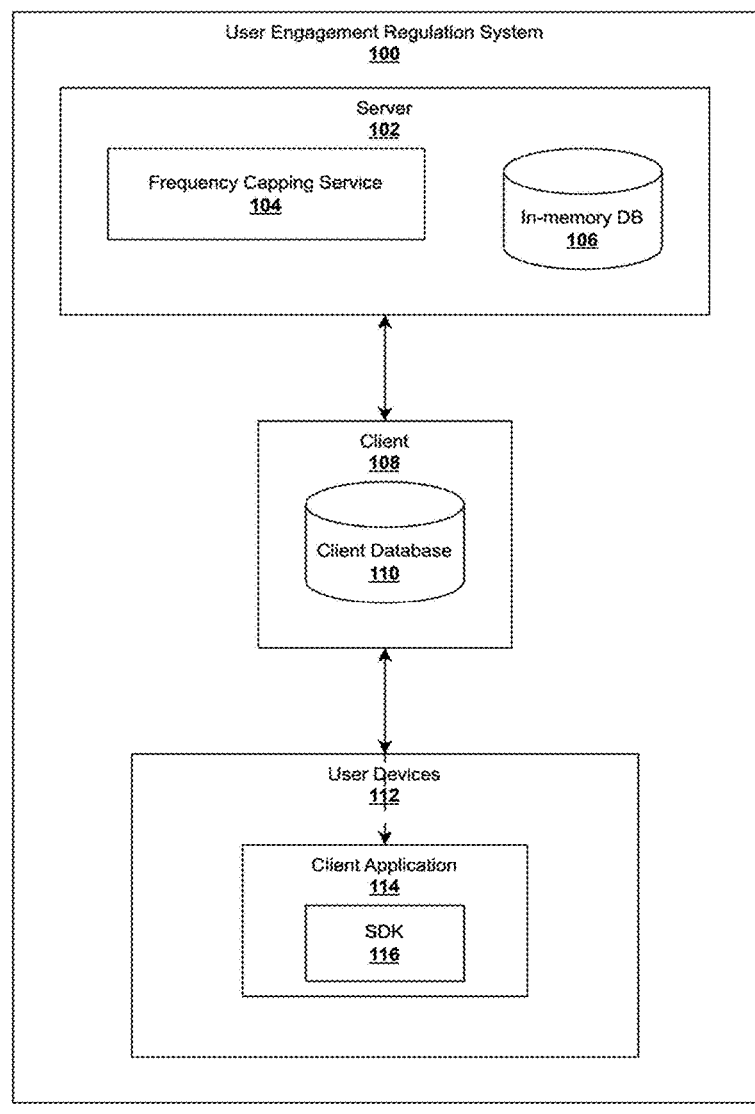

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "comparing," "determining," "creating," "incrementing," "outputting," "updating," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The User Engagement Regulation System is designed to regulate the frequency of outbound communications, such as push notifications, in accordance with configurable delivery rules defined by a client. These rules are typically expressed as limits on the number of messages that may be sent to an end user over a defined time window, often segmented by communication channel, campaign type, or contextual labels. The system ensures that outbound messages are evaluated in real time against these frequency limits to prevent over-engagement and notification fatigue among end users, while allowing clients to maintain flexible and targeted campaign delivery strategies.

The system architecture includes a centralized server component, one or more clients (e.g., businesses using the platform), and end-user devices. The server includes a Frequency Capping Service responsible for determining whether a given message can be sent to a user based on the applicable rule set. The decision is based on a record of recent user interactions and a configurable rule schema provided by the client. To ensure speed, atomicity, and horizontal scalability, the system uses an in-memory database where frequency tracking is performed using hash structures.

Clients maintain internal user data and campaign metadata and interact with the server by submitting message context data, including identifiers such as user ID, client ID, campaign ID, communication channel, labels, and triggers. This data is processed by the Frequency Capping Service to generate uniquely identifiable hash keys and corresponding counter-field identifiers. These elements are then used to look up or update engagement-counter records in the in-memory database. If the applicable counter exceeds the configured limit, the system suppresses the message; otherwise, it allows delivery to proceed.

On the user-facing side, client applications installed on user devices are integrated with a software development kit (SDK) that facilitates message tracking, engagement monitoring, and synchronization with client systems. The SDK may also collect device-level information such as user identifiers and time zones, which are used by the server to compute calendar-based windows for evaluating frequency limits. This ensures that frequency capping operates consistently for users located in different time zones and respects time-based windows (e.g., per day, per week) accurately.

The overall system is optimized to minimize storage, reduce latency, and avoid race conditions during high-concurrency operations. By executing atomic hash-field increment operations within a batched pipeline and rolling back increments in case of rule violations, the system maintains accurate counters without requiring locking or full record retrieval. This architecture provides a robust foundation for delivering scalable, intelligent, and client-configurable user engagement regulation across a wide variety of outbound communication scenarios.

For example, assume two independent message-processing threads—Thread A and Thread B—attempt to send a promotional push notification to the same user at nearly the same moment. Each thread derives the same hash key (representing that user, client, and channel) and the same counter-field identifier (representing the "promotional-push-daily" metric). Instead of performing a read-modify-write sequence that could let both threads act on the same stale value, each thread issues a single atomic increment command against the in-memory database as part of its own pipeline. Because the underlying database executes commands sequentially and atomically on a single core, the operations proceed as follows:

| Arrival order | Value returned by the atomic increment | Thread action |
|---|---|---|
| Thread A | 1 | Within limit → proceeds to send |
| Thread B | 2 | Exceeds limit → immediately issues a matching atomic decrement (−1) and suppresses the send |

Because each increment is atomic, Thread B observes the updated value "2" rather than the stale value "1" seen by Thread A. It therefore detects the breach and rolls back. No explicit locks are required, no race condition arises, and the user receives at most one promotional push, exactly in line with the configured frequency cap. Atomic means that the increment (or decrement) operation on the counter field is performed as a single, indivisible action inside the in-memory database. While that operation is executing, no other thread or process can observe a partial state or interleave its own update to the same counter. As a result:

The counter either changes from N to N+1 (or N−1 in the rollback case) in one step, or it does not change at all—there is no intermediate value visible to any other request.

Competing threads always see a consistent, up-to-date value. Thread B, arriving microseconds after Thread A, receives the post-increment value that already reflects Thread A's update, not the stale pre-increment value.

No explicit locking or read-modify-write sequence is required at the application layer; the in-memory database guarantees the all-or-nothing behavior internally.

By guaranteeing this indivisibility, atomic operations eliminate the race conditions that could otherwise allow two concurrent sends to bypass the frequency cap.

FIG. 1 illustrates an example architecture of a User Engagement Regulation System 100 for regulating the delivery frequency of outbound communications such as notifications, messages, or alerts to end users based on predefined frequency capping rules. The system 100 includes a server 102, a client 108, and one or more user devices 112, which communicate over one or more networks (not shown), such as the Internet.

The server 102 hosts a Frequency Capping Service 104 that executes the logic for evaluating engagement rules and determining whether an outbound communication to a particular user is permissible. The Frequency Capping Service 104 operates in conjunction with an in-memory database 106, which stores user-specific engagement data using a hash-based key-value structure. The in-memory database 106 maintains engagement-counter records, where each hash is keyed by a unique combination of identifiers such as user ID, client ID, and channel ID, and each hash field corresponds to a specific engagement rule derived from parameters such as label, trigger, campaign, and temporal interval.

The client 108 represents an enterprise or service provider utilizing the frequency capping system. The client 108 includes a client database 110 that stores user profile information, campaign configurations, engagement rules, and other relevant data. The client may formulate requests to the server 102 containing message context data for frequency evaluation.

The user devices 112 include mobile phones, tablets, computers, or other computing devices operated by end users. Each user device runs a client application 114 through which the user receives messages or notifications. The client application 114 integrates a software development kit (SDK) 116 that facilitates data collection and communication with the client 108 and the server 102. The SDK 116 may collect message context data, track delivery events, identify time zones, and support enforcement of frequency capping decisions received from the server.

During operation, the client application 114 collects relevant message context data and transmits it to the client 108, which may enrich or validate the data and forward it to the Frequency Capping Service 104. The service processes the request, updates or queries the corresponding engagement-counter record from the in-memory database 106, and returns a decision indicating whether the message should be delivered or suppressed. This architecture ensures scalable, atomic, and consistent enforcement of frequency limits across multiple users and campaigns in real-time environments.

The User Engagement Regulation System receives channel message context data, which includes a structured set of identifiers used to evaluate and enforce frequency capping rules for outbound messages. This context data is received as part of a delivery evaluation request initiated by the client, typically through an API call or SDK interaction, and provides the necessary information for the system to determine whether a given message should be allowed or suppressed based on prior engagement history and configured delivery limits.

The message context data comprises a user identifier, which uniquely identifies the end user to whom the communication is intended. This identifier may be an alphanumeric token, a UUID, or another consistent reference that maps to the user's record within the client's system. The client identifier distinguishes the client organization using the frequency capping platform. In multi-tenant environments, this identifier is critical to logically partition user engagement data and rule configurations across different organizations.

The campaign identifier specifies the particular campaign under which the message is categorized. Campaigns may include marketing pushes, transactional alerts, or informational newsletters. This identifier enables the system to distinguish frequency constraints at the campaign level, ensuring that message counts and suppression logic can be applied independently to different campaigns for the same user.

The channel identifier denotes the medium through which the message is to be delivered, such as push notifications, email, SMS, in-app messages, or others. Frequency capping logic often varies by channel, and this identifier allows the system to apply channel-specific thresholds or apply broader limits across channels if configured to do so.

The label identifier and trigger identifier provide further granularity. The label identifier can refer to categories or tags applied to messages (e.g., "promotional", "order update", "reminder"), while the trigger identifier may indicate the event or user action that initiated the message (e.g., cart abandonment, order delivery, app open). These identifiers support highly contextual frequency regulation by allowing the client to specify caps not just globally, but down to specific user-event-message combinations.

Together, these identifiers form the foundational data used by the system to construct unique keys for engagement-counter records and to determine whether delivery of the current message should proceed. This fine-grained context ensures that frequency rules are applied in a precise, scalable, and configurable manner across millions of users and diverse messaging scenarios.

In various embodiments, the User Engagement Regulation System is configured to operate in a multi-tenant architecture, enabling it to serve multiple distinct clients concurrently. Each client represents an independent organization or business entity, such as an e-commerce platform, financial service provider, or digital content distributor. The system maintains logical and data isolation between clients, ensuring that each client's frequency capping rules, user engagement data, and campaign configurations are stored and processed independently, even though they may share the same backend infrastructure.

Each client may manage a very large user base, potentially in the order of millions of end users. The system is designed to scale horizontally, allowing frequency capping decisions to be processed in real time across this large user population. In one embodiment, a single user associated with a client may belong to multiple clusters or segments, based on behavioral traits, demographic attributes, or engagement history. These clusters may be dynamically defined and updated by the client for campaign targeting purposes. Furthermore, a client may initiate and deliver a plurality of campaigns simultaneously, each campaign targeting one or more clusters of users. The system efficiently handles the evaluation of frequency capping constraints across all relevant clusters and campaigns to ensure that no message is sent in violation of the configured engagement rules.

In an embodiment, outbound engagement with end users occurs at a high scale, with tens of campaigns per client being executed every minute. Each of these campaigns may be configured with a distinct combination of parameters including the target user segment, message intention (e.g., promotional, transactional), message category or label, trigger criteria (e.g., user behavior or event-driven logic), and message delivery channel (e.g., push, email, SMS). This high-throughput, multi-dimensional campaign execution environment necessitates a precise and scalable mechanism to ensure that outbound messaging remains compliant with client-defined engagement limits.

Given that each campaign is executed independently, and that overlap between campaign target user segments is common, it becomes essential to implement a control mechanism that can track and restrict message delivery at the level of individual users, across multiple campaigns. Without such a mechanism, users may inadvertently receive an excessive number of communications within a short period, resulting in engagement fatigue or attrition. To address this challenge, the User Engagement Regulator service acts as a centralized enforcement system for frequency capping. The service ensures that messages are delivered only when predefined limits have not been breached, thereby maintaining an optimal balance between campaign execution velocity and user experience.

Clients using the platform are provided with the ability to configure engagement rule settings, also referred to as setting metrics. These settings define the frequency capping logic the client wishes to apply to outbound campaigns. For example, a client may specify that a user should receive no more than five promotional messages across any channel within a seven-day window, or no more than two triggered push notifications in a single day. These settings may also account for message categories (labels), channels, or campaign types, enabling clients to design highly granular and context-aware frequency control strategies.

The User Engagement Regulator service operates on the basis of well-defined input parameters, which are provided by the client system at runtime. These payload parameters include: (a) a list of end user identifiers representing the users targeted by the campaign; (b) a client identifier to logically scope the request to a specific tenant; and (c) a campaign object, which encapsulates metadata such as the message channel, category label, trigger information, and associated configuration rules. Based on these parameters, the service constructs a unique key to access or update the user's engagement state in a high-performance in-memory database and determine whether a message delivery should be allowed or suppressed in real time.

In an example and not by way of any limitation, the user-ID and client-ID elements of the message-context data are concatenated (or otherwise mapped) to form the hash key—e.g., u:ACME:98765.

The channel, label, trigger, campaign, and temporal-window tokens are concatenated to form the hash-field name—e.g., push_newsletter_event_cmp42_2025-07-01.

The service issues a single atomic hash-field-increment operation against the derived key/field.

If an engagement-counter record keyed by u:ACME: 98765 already exists in the in-memory database, only the targeted field is updated.

If the record does not exist, the in-memory database implicitly creates the hash and the field, initialising the counter to 1.

No other parts of the message-context payload are stored in the in-memory database.

Resulting Data Structure

Key: u:ACME:98765 (one per user & tenant)

Field: push_newsletter_event_cmp42_2025-07-01

Value: 1←counter after increment

TTL: seconds until next midnight (set if not present)

Upon receipt of the message context data, the system proceeds to determine a unique counter-field identifier. This identifier is generated by encoding multiple elements of the message context—specifically, the channel identifier, label identifier, trigger identifier, campaign identifier, and a temporal-interval indicator—into a compact, deterministic representation. The counter-field identifier serves as a unique key within a broader hash data structure, enabling fine-grained tracking of outbound message delivery across various dimensions of user engagement.

Based on the counter-field identifier and the received message context data, the system constructs a structured document, referred to herein as a User Engagement Regulator Schema document. This document is generated in accordance with the client-configured metric settings that define how message frequency should be regulated. These settings may include campaign-specific frequency limits, channel constraints, label-specific caps, and time window definitions (e.g., X messages in Y days). The document reflects the runtime state and configuration applicable to a particular user and campaign interaction, and is used to determine whether further message delivery is permissible under the current rule set.

The User Engagement Regulator Schema document is stored within a clustered in-memory database to provide rapid access and atomic updates in a distributed, high-concurrency environment. The database maintains each document in a hash-style data structure, enabling consistent and race-free counter updates even during high-throughput, simultaneous campaign execution across large user populations.

Each document in the in-memory database can be logically divided into three parts. First, the hash-set name acts as the primary key and is derived from a unique combination of the user identifier, client identifier, and—optionally—the channel identifier, so that every user's engagement state is uniquely addressable and tenant-scoped. Second, the hash-set field represents the encoded counter-field identifier. This field is typically a shortened alphanumeric string, often one or two characters in length, that uniquely maps to a specific engagement rule or metric configured by the client, thereby supporting compact storage and rapid look-ups during rule evaluation.

Third, the Hash Set Field Value represents the current counter value for the number of successful engagements recorded under the corresponding rule. This value is incremented atomically when a message is permitted and delivered to the user and may be decremented or rolled back in the event of a delivery failure or rule violation. The system uses this field value in real time to compare against the client-configured frequency limits, thereby determining whether a suppression signal or an allow signal should be returned for the message delivery request.

Following construction of the counter-field identifier, the system creates the corresponding counter field within a hash record stored in the in-memory database if that field does not already exist. This creation step prepares the record so the system can determine whether delivering a given message would violate a configured frequency-capping rule. Because each hash record is scoped to a unique combination of user identifier, client identifier, and—optionally—channel identifier, engagement tracking remains isolated on a per-user, per-client basis across all relevant contexts.

Before evaluating individual rules for each user in a campaign, the processor initializes an execution pipeline provided by the in-memory database. The pipeline batches multiple commands so they can be transmitted and executed in a single round trip, thereby minimizing latency and network overhead while preserving atomicity. For every rule that applies, the processor forms the hash-set field using the derived counter-field identifier (e.g., a "promotional push" metric for the current calendar window) and queues an atomic hash-field increment of +1 into the pipeline.

After all increment commands have been queued, the pipeline is executed. This step atomically increments the value stored in each counter field. Because the database guarantees atomic execution, no two overlapping requests can produce race conditions or inconsistent state updates— even when multiple campaigns target the same user during the same temporal interval.

The pipeline returns updated counter values for every rule-user combination. The processor stores these responses for further evaluation and then compares each value with the corresponding client-defined limit to decide whether the associated message should be delivered or suppressed. Using the freshly updated counts ensures that every decision is based on the most current engagement state, maintaining consistent enforcement of frequency caps.

If any counter value exceeds its configured limit, the system marks that condition as a breach. To restore the counter to its prior value and maintain consistency, the processor immediately issues a compensating atomic decrement (−1) for the affected field. This rollback operation ensures that the engagement record reflects only messages that are actually permitted. The increments are therefore optimistic—assuming the message can be sent—and are reconciled after rule evaluation.

The comparison-and-rollback sequence maintains strict enforcement without locking or delaying counter updates. By temporarily allowing increments and reversing them only when a rule is violated, the design delivers high performance, atomicity, and real-time decision-making across millions of users and messages while preserving the integrity of engagement tracking for every campaign.

To support high-throughput, low-latency decision-making, the system adopts an optimistic evaluation strategy: it pre-emptively increments each relevant counter field before checking limits. This minimizes per-user processing time when campaigns target large populations across multiple rule dimensions.

After pipeline execution, the processor validates the increments against the limits stored in the rule set. If a counter breaches its limit, the processor performs the compensating decrement described above. Because the increment-and-decrement operations are atomic, only valid increments remain in the database, avoiding the need for locks or two-phase commits.

A single user can be evaluated against multiple rule sets within one request—for example, both a global-campaign rule and a channel-specific rule. To avoid redundant processing, the system keeps a temporary record of any user who breaches a rule during the current request cycle. Once a user is flagged as having violated a rule, subsequent rule evaluations for that user are skipped, preventing unnecessary reads, writes, and comparisons.

This pruning optimization substantially reduces the number of database calls and improves system efficiency, particularly under high-concurrency loads. The processor can also leverage recently cached engagement history to make informed decisions without re-evaluating every rule, further accelerating the workflow while maintaining strict compliance with client-defined frequency-capping policies.

The system evaluates user-engagement rule sets within one or more calendar-day windows, ensuring that frequency limits are applied to each user inside clearly defined time intervals. To implement window boundaries, the in-memory database supports per-key time-to-live (TTL) metadata that automatically invalidates an engagement-counter record once its TTL expires. When a counter field for a particular user is incremented for the first time in a new calendar window—that is, when the atomic increment returns a value of 1—the processor recognises that the engagement document is being initialised for that window and that no TTL has yet been attached. The processor then calculates the number of seconds remaining until the end of the current calendar day in the user's time-zone. That interval is written back to the in-memory database as the TTL for the hash key representing the user's engagement state. When the TTL elapses, the entire record automatically expires, causing the counters to reset for the next calendar window. This automated expiration mechanism allows the system to enforce time-scoped constraints—such as "X messages in Y days" or "N pushes per day"—without manual cleanup or additional scheduler logic, thereby guaranteeing consistent, repeatable frequency enforcement across successive calendar periods.

Following the evaluation and comparison of counter values against the configured frequency limits, the system compiles and returns a list of user identifiers that have either breached or respected the applicable engagement rule sets. This output enables downstream components (e.g., campaign execution engines) to determine, on a per-user basis, whether a message should be delivered or suppressed in accordance with the rule configuration. This integration ensures real-time enforcement of campaign-specific messaging strategies while respecting user-level engagement constraints.

To handle situations in which a message ultimately fails to reach the user after the associated engagement counter has already been incremented, the system employs a rollback mechanism that preserves consistency in the stored engagement state. In such cases, the processor recomputes the relevant hash-set field, accesses the corresponding counter field in the in-memory database, and issues an atomic decrement operation that subtracts one from the counter value. This compensating update restores the counter to its prior state, thereby preventing an undelivered message from erroneously consuming part of the user's frequency allowance.

After performing the decrement, the processor verifies that the resulting counter value is a valid whole number. If the value is found to be non-numeric or otherwise inconsistent—due, for example, to data corruption or an unusual concurrent mutation—the processor executes a hash-field deletion operation to remove the affected field entirely. By purging invalid or partially updated data, the system guarantees that every engagement-counter record remains in a correct and deterministic state, thereby safeguarding the integrity of the frequency-capping mechanism across all user interactions.

To enforce engagement frequency rules within bounded time intervals, the system implements a calendar window computation process that determines the temporal scope applicable to each engagement-counter record. In an embodiment, the system calculates this window based on the calendar day of the end user, taking into account the user's associated time zone. This process ensures that frequency limits—such as "no more than N messages per day"—are applied accurately across global user bases with varying local times.

When message context data is received, the system first identifies the applicable time zone for the user. This time zone may be provided explicitly as part of the message payload or derived from a user profile stored in an external system or data store. Upon determining the time zone, the system computes the start and end boundaries of the current calendar day in that time zone. The window typically begins at 00:00 (midnight) local time and ends at 23:59:59 of the same day.

This computed window is then used to assign a temporal-interval indicator, which is encoded into the counter-field identifier. In particular, the current calendar date may be converted into a normalized format (e.g., YYYYMMDD) and appended to the counter-field identifier. This ensures that engagement counters for different calendar days are maintained in separate fields within the same hash record, thereby enabling isolated tracking per day without overwriting historical counts.

To maintain validity and prevent stale data accumulation in the in-memory database, the system further computes the remaining duration until the end of the current calendar day, relative to the system's current time in the user's local time zone. This duration is used to set the expiration interval for the hash key representing the user's engagement document. The expiration ensures that the counter data for that calendar day is automatically purged after the window closes, allowing a fresh counter to be initialized on the following day without manual intervention.

This calendar-based computation allows the system to enforce frequency capping policies consistently across users regardless of geographic location, and ensures compliance with constraints that depend on daily, weekly, or other recurring time windows. The process is designed to be computationally efficient and is typically executed at the time of first message evaluation or when a new engagement document is created for a user on a given day.

After evaluating the engagement counters against the frequency limits configured for each rule set, the system generates a corresponding output signal for each evaluated user. This output signal indicates whether a message delivery request should be allowed or suppressed based on the user's current engagement state and the configured campaign-level constraints.

In one embodiment, the system returns a structured response containing the user identifier and a signal status, where the status is either "allow" (indicating the frequency cap has not been breached) or "suppress" (indicating that the user has already received the maximum permitted messages for the given rule set and calendar window). This response may also include additional metadata, such as the specific rule that was violated, the corresponding counter value, and the threshold defined in the rule set. This enables transparency and traceability of the decision logic for each message evaluation.

The output signals are typically returned as part of an API response to the calling entity, which could be a campaign orchestration engine, a message dispatch system, or an external client-side application integrated with the engagement platform. Upon receipt of the signal, the caller takes appropriate action in accordance with the campaign configuration. For example, if the signal is "allow," the message may be queued for delivery via the specified channel. If the signal is "suppress," the message may be skipped, deferred, or replaced with an alternative low-priority communication.

In more complex scenarios where a campaign is governed by multiple rules simultaneously—such as a combination of global, channel-level, and label-specific constraints—the system determines the first breached rule in descending order of breadth (e.g., global>channel>label>trigger), and uses that rule to generate the suppression decision. This ensures consistent prioritization of broader rules over more granular ones and avoids conflicting signal outputs.

By decoupling the frequency evaluation logic from the message sending pipeline, the system allows clients and internal messaging services to enforce dynamic frequency capping policies in real-time without manual monitoring or throttling. This modular design supports both synchronous (blocking) and asynchronous (batch) use cases, enabling large-scale message filtering without sacrificing system throughput or user experience.

After evaluating the engagement rules and executing any necessary increment or rollback operations, the system performs an update to the engagement-counter record stored in an in-memory database, such as Redis. This update ensures that the current state of user engagement is persistently stored and available for future evaluations. The engagement-counter record is implemented as a hash, where the hash key uniquely represents the user's context-typically derived from the user identifier, client identifier, and optionally, a channel identifier. Within this hash, each counter field corresponds to a specific engagement rule, as defined by the counter-field identifier. The update operation modifies the field value, either by incrementing it upon a valid message delivery or decrementing it in case of a rollback due to delivery failure or rule violation. These updates are performed using atomic commands, ensuring consistency and correctness under concurrent access. This updated engagement-counter record forms the authoritative source of truth for the system to determine whether future message requests would result in a breach, thereby enabling reliable enforcement of dynamic frequency-capping rules across multiple campaigns and user segments.

In one embodiment, the User Engagement Regulator system maintains per-user frequency capping records using an in-memory database (in-memory key-value store). Each user's record is uniquely identified using a structured hash key composed of multiple parameters, enabling precise tracking and retrieval. A representative example of such a key is:

FC:ExampleDB:60de8b9e013f326268852b60:P:A:0

This key can be broken down as follows:

FC designates the record as part of the frequency capping system.

ExampleDB represents the namespace or client-specific database identifier.

60de8b9e013f326268852b60 is the unique user identifier, typically a 24-character hexadecimal string.

P is the channel identifier, e.g., for push notifications.

A is the platform identifier, e.g., Android.

0 denotes the bucket or calendar window index (e.g., representing the current day).

This key formation allows the system to isolate engagement counters per user, per platform, per communication channel, and per time window.

The corresponding value stored at the hash key is implemented as a hash map. Each field in the hash tracks a specific engagement counter or metadata, as shown below:

| Field | Meaning | Example Value |
|---|---|---|
| CR | Timestamp of document creation (epoch) | 16175251822 |
| O | Android overall message count | 4 |
| B | Android batched messages | 2 |
| T | Android event-triggered messages | 1 |
| G | Android geofence-triggered messages | 1 |
| R | Android real-time triggered messages | 1 |

This structure enables fast and atomic read/write operations via in-memory database mechanisms such as hash-based increment commands, and allows engagement limits to be evaluated per message category. When a message is about to be delivered, the system increments the appropriate field (e.g., T for event-triggered), checks if the updated value exceeds the configured rule, and either permits or suppresses delivery accordingly.

Additionally, the CR field stores the epoch timestamp when the record was created. This timestamp can be used to determine whether a TTL (Time-To-Live) should be set using the EXPIRE command, ensuring the engagement document is valid only for the configured calendar window. This design supports real-time evaluation and enforcement of frequency capping rules for millions of users across multiple clients.

In scenarios involving large-scale client deployments, the User Engagement Regulator system is capable of efficiently handling engagement tracking for millions of end users. For example, when a client manages one million users, the system generates and maintains one engagement document per user, resulting in the creation of one million hash-based documents (or has based data structures) within the in-memory database. Each document is uniquely keyed using a combination of the user identifier, client identifier, platform, channel, and temporal bucket, ensuring that engagement data remains logically isolated per user and per rule context. This one-to-one mapping between users and engagement documents enables high-resolution tracking of message delivery activity and supports precise application of frequency capping rules. The use of hashed data structures, compact field identifiers, and batched Redis pipelines ensures that the system remains scalable and performant, even when managing high-throughput campaign workflows that target millions of recipients concurrently.

It may be noted that in order to achieve optimal performance and memory efficiency, the system utilizes hash-based data models maps rather than standard string key-value pairs for storing user engagement documents. This decision significantly reduces the memory footprint required to track millions of user interactions in high-scale environments.

In a conventional string-based key-value setup, each key-value pair is stored as a string key and string value. For example, storing one such pair requires approximately 39 bytes for the key, 49 bytes for the value, and an additional 32 bytes of metadata overhead, totaling approximately 120 bytes per entry. When scaling to 1 million key-value pairs, the total memory requirement amounts to approximately 120 megabytes. This method becomes increasingly inefficient as the number of entries scales upward.

In contrast, storing the same data using hash-based structure allows multiple field-value pairs to be maintained under a single database key. A typical hash map entry consumes approximately 39 bytes for the key, 20 bytes for the field-value, and only 10 bytes for metadata overhead, totaling approximately 70 bytes per entry. Therefore, storing 1 million such hash entries would consume approximately 70 megabytes, resulting in a substantial memory saving.

By leveraging hash-based storage within in-memory database, the system achieves an approximate 41% reduction in memory usage compared to traditional string-based storage. This gain is particularly beneficial when storing compact values like integers or short strings. In-memory database internally optimizes hash structures using compressed encoding techniques like ziplist, which allows for compact storage of field-value pairs. This optimization not only conserves memory but also enables faster access and atomic operations on individual counters, which is essential for real-time frequency capping enforcement in high-throughput systems.

Thus, the implementation of hash-based engagement documents in the in-memory database contributes to the scalability and responsiveness of the User Engagement Regulator system, enabling it to manage millions of user engagement records efficiently.

In an example, a user may be simultaneously eligible for multiple campaigns targeting the same delivery channel— such as push notifications. The system applies frequency capping rules to determine which messages should be sent or suppressed in order to prevent over-engagement. For example, consider a user who is a part of five ongoing push campaigns: C1 through C5. The client has configured the following capping rules for push communications: (i) a maximum of two push messages per day, (ii) a maximum of one newsletter-type push, and (iii) a maximum of one promotional-type push per user per day.

The system evaluates each campaign against the rules in the order of their configuration. Campaign C1 is classified as a newsletter and is allowed to be sent since the newsletter quota has not yet been consumed. However, campaign C2, which is also a newsletter, is dropped because the newsletter limit has already been met by C1. Campaign C3 is a transactional message and is allowed to be sent as transactional messages are not subject to any configured label-specific caps in this case.

Following that, campaign C4, labeled as promotional, is evaluated. Although the promotional label cap has not been breached yet, the global rule of allowing only two push notifications per day has already been reached with C1 and C3. As a result, both C4 and the subsequent C5 (which is a general push) are dropped to respect the overall push notification limit. This example illustrates how the User Engagement Regulator system dynamically applies both global and label-level rules to ensure adherence to client-configured engagement policies.

In one exemplary scenario, a client system initiates a request to regulate outbound notifications for a group of end users participating in a campaign. The request payload includes: (i) a list of user identifiers, (ii) a client identifier, and (iii) a campaign object that specifies the campaign identifier, message channel (e.g., push), label (e.g., promotional), and trigger type (e.g., event-based). Upon receiving this message context data, the User Engagement Regulator system begins by deriving a hash key for each user based on a combination of the user identifier, client identifier, and channel identifier. Additionally, it derives a counter-field identifier by encoding the campaign identifier, label, trigger type, and a temporal-interval indicator (e.g., day, week) that defines the applicable calendar window.

Using these identifiers, the system attempts to retrieve an engagement-counter record for each user from the in-memory database. If the record does not exist (e.g., the user is engaging with the system for the first time in the specified calendar interval), the system creates a new engagement-counter record keyed to the derived hash key, and initializes the counter field associated with the counter-field identifier to zero.

The system then proceeds with an optimistic assumption that each message is eligible for delivery and performs atomic increment operations on the relevant counter fields within the in-memory database. These operations may be grouped and executed in a batched manner to ensure low-latency and consistent updates. Once all increment operations have been executed, the system retrieves the updated counter values and evaluates them against the frequency capping thresholds defined in the client's configuration. For example, if a client specifies a rule limiting the user to no more than three promotional messages via a specific channel per day, the system verifies whether the updated counter exceeds this limit. If the threshold is breached, the system performs a compensating decrement operation on the affected counter field and marks the message as suppressed for that user.

For users whose counters remain within permissible limits, the system allows the message to be delivered. The system also checks if an expiration (TTL) is required for the engagement-counter record by inspecting whether the hash was newly created. If an expiration is needed, the system calculates the remaining duration until the end of the current calendar day, taking into account the user's associated timezone, and assigns this as the expiration interval. Finally, the system returns a list of user identifiers tagged with their respective status—either "allow" or "suppress"—which the calling service can use to proceed with or cancel the campaign delivery per user.

In an alternate embodiment of the present invention, the system may be configured to retrieve an existing engagement-counter record from an in-memory database, such as Redis, CockrochDB, Aerospike, using a key that is derived from a combination of a user identifier and a client identifier. This embodiment may be particularly useful in implementations where the engagement document structure is less granular or where the system is optimized to manage fewer keys by using broader identifiers. In such a case, rather than generating a compound hash key using multiple parameters (e.g., channel, trigger, label), the system directly accesses a preexisting engagement record based on the user and client context alone. This allows for quicker retrieval and evaluation of user engagement data when fine-grained segmentation is not required.

Once the engagement-counter record has been retrieved, the system evaluates whether a specific counter field exists within the record, where the counter field is uniquely identified by a counter-field identifier. This identifier may encode campaign-related attributes such as the label, trigger, campaign identifier, and temporal-interval indicator. If the system detects that the counter-field identifier is not present within the engagement-counter record—indicating that this specific engagement metric has not yet been tracked—it creates the counter field and initializes it, typically to zero. This dynamic creation of counter fields ensures that the system adapts in real time to new engagement rules or campaign combinations without requiring prior record creation, thereby maintaining scalability and flexibility.

Further, in some embodiments, the system may support dynamic rule updates through receipt of a rule-update request from the client. Such a request may contain modified frequency capping limits or new rules to be applied to user segments. Upon receiving this request, the system adjusts the relevant limit values stored in association with the engagement rules. During subsequent retrievals of engagement-counter records, the updated limits are applied to determine whether a given user's engagement has breached the updated thresholds. This feature ensures that the system remains aligned with the latest campaign policies defined by the client and prevents over-engagement or under-engagement based on outdated rule sets. This adaptability is particularly important in fast-changing marketing environments where campaign dynamics shift frequently.

In some embodiments, the system provides a graphical user interface through which clients can configure frequency capping settings directly within the campaign management dashboard. This configuration interface allows clients to define engagement limits on outbound messages based on various dimensions, including but not limited to, the communication channel (e.g., push, email, SMS), message label (e.g., promotional, transactional, newsletter), and time interval (e.g., per day, per week). Clients may specify granular rules such as "not more than three promotional messages via push per user per day" or "only one newsletter email per user per week." These inputs are translated into rule configurations that are programmatically enforced by the User Engagement Regulator system during message delivery execution.

The frequency capping configuration process includes selecting a label for the campaign, choosing the applicable time interval (such as daily, weekly, or monthly), and defining the maximum number of messages a user can receive under that configuration. These rules can be created, updated, or removed in real time through the dashboard, offering campaign managers fine-grained control over user communication strategies. Once saved, these rules are stored within the system and dynamically retrieved during engagement counter evaluation. This architecture allows marketing teams to tailor message frequency based on audience behavior and business objectives while ensuring compliance with user engagement limits across simultaneous, large-scale campaigns.

Figure 2:
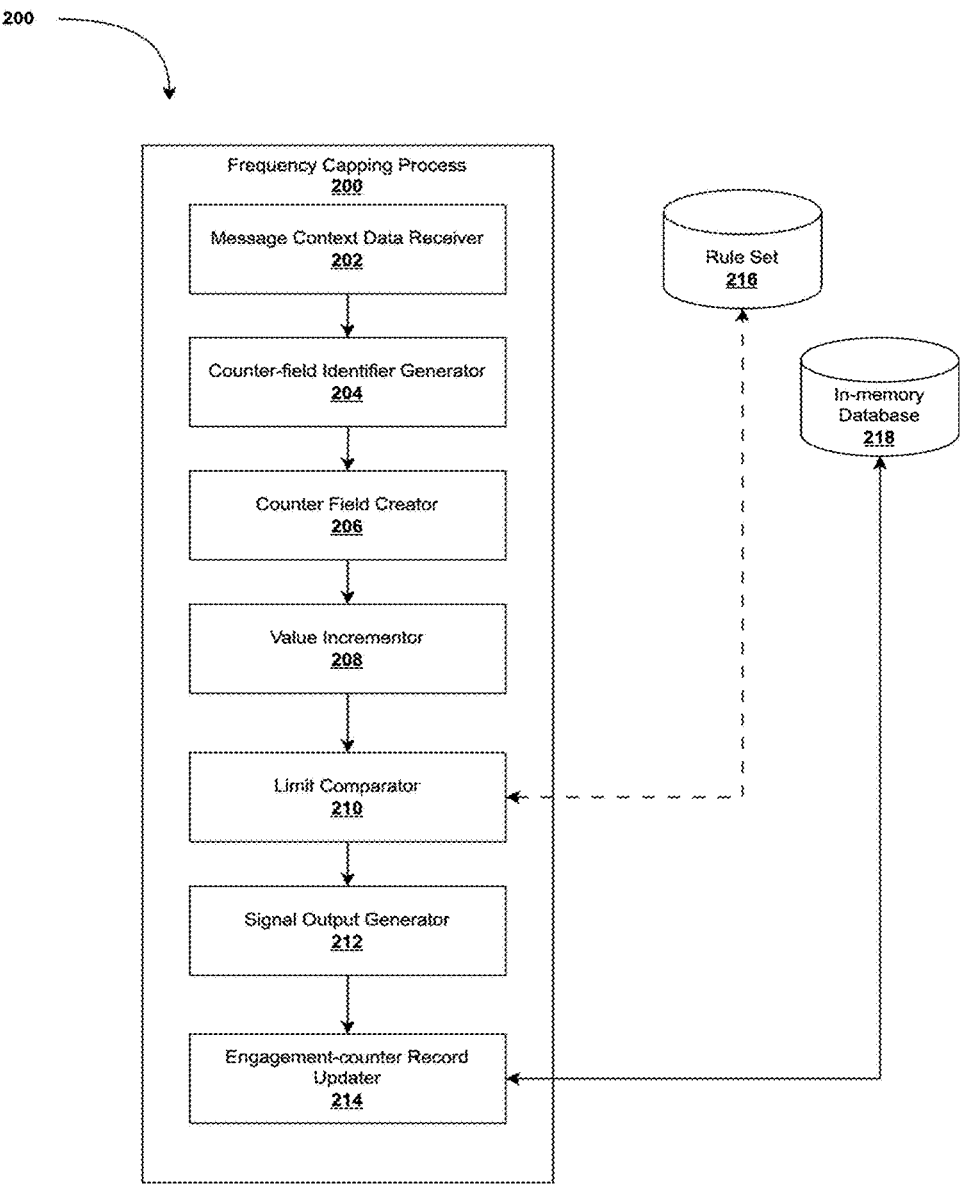
FIG. 2 depicts a flowchart of a frequency capping process, outlining the steps involved in regulating the delivery of communications.

FIG. 2 depicts a flowchart of a frequency capping process 200 for regulating delivery of communications. The process begins with a message context data receiver 202 that accepts input data. This data may then flow to a counter-field identifier generator 204, which may process the input to generate an identifier. A counter field creator 206 may then establish a new counter field. The process may proceed to a value incrementor 208, which may increase the counter value through an atomic operation. A limit comparator 210 may evaluate the value against predetermined limits stored in a rule set 216. Based on this comparison, a signal output generator 212 may produce either an allow or suppress signal. The process may conclude with an engagement-counter record updater 214, which may interface with a in-memory database 218 to maintain the current state of engagement counters.

Figure 3:
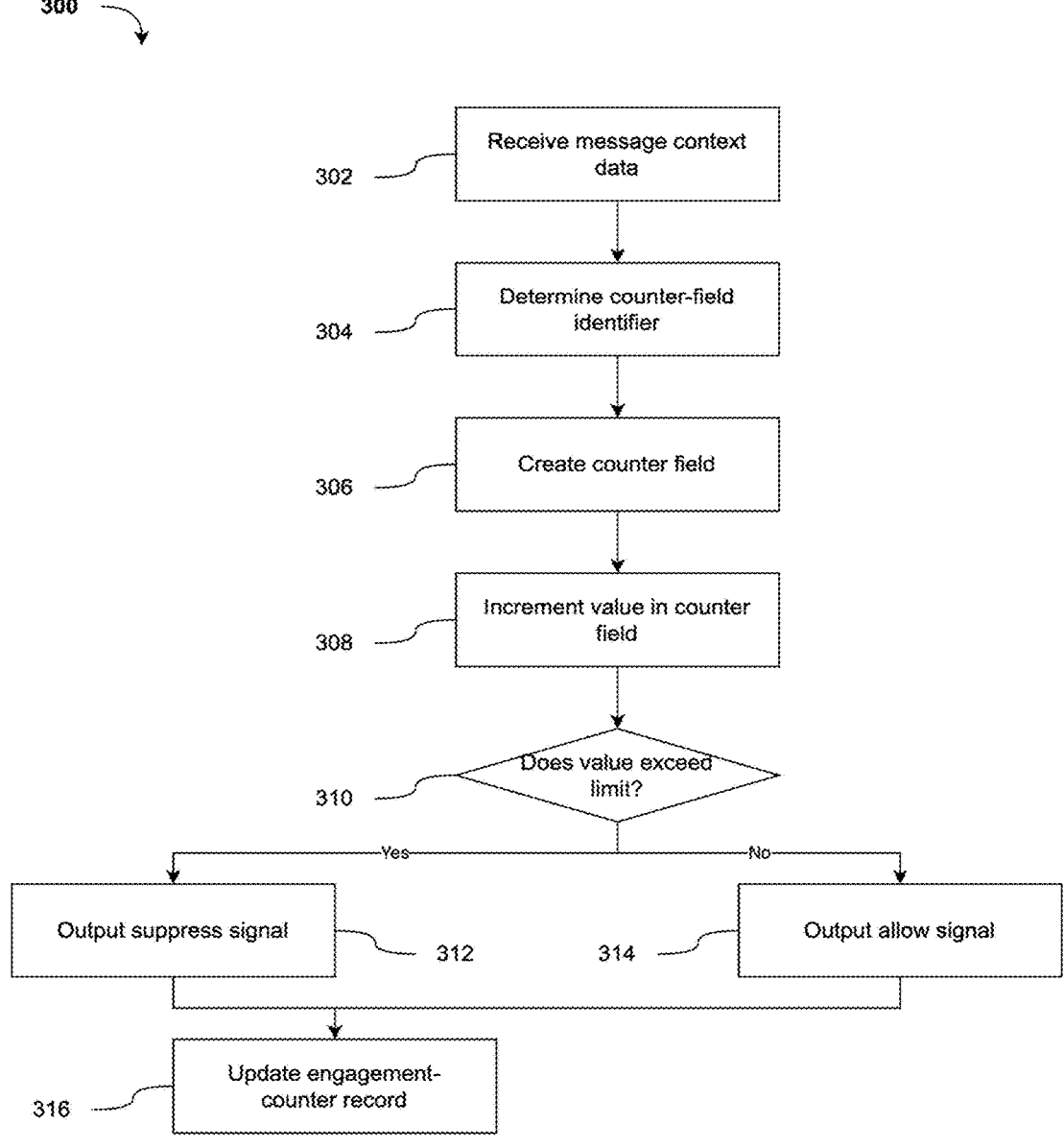
FIG. 3 shows a flowchart of a method for regulating message delivery, detailing the decision-making process for allowing or suppressing communications.

FIG. 3 shows a flowchart of a method 300 for regulating message delivery. The method may begin with receiving message context data (step 302), followed by determining a counter-field identifier (step 304). A counter field may then be created (step 306), and a value in the counter field may be incremented (step 308). The method may then compare the value to a limit (step 310). If the value exceeds the limit, a suppress signal may be output (step 312). If the value does not exceed the limit, an allow signal may be output (step 314). Both paths may converge at updating an engagement-counter record (step 316).

Figure 4:
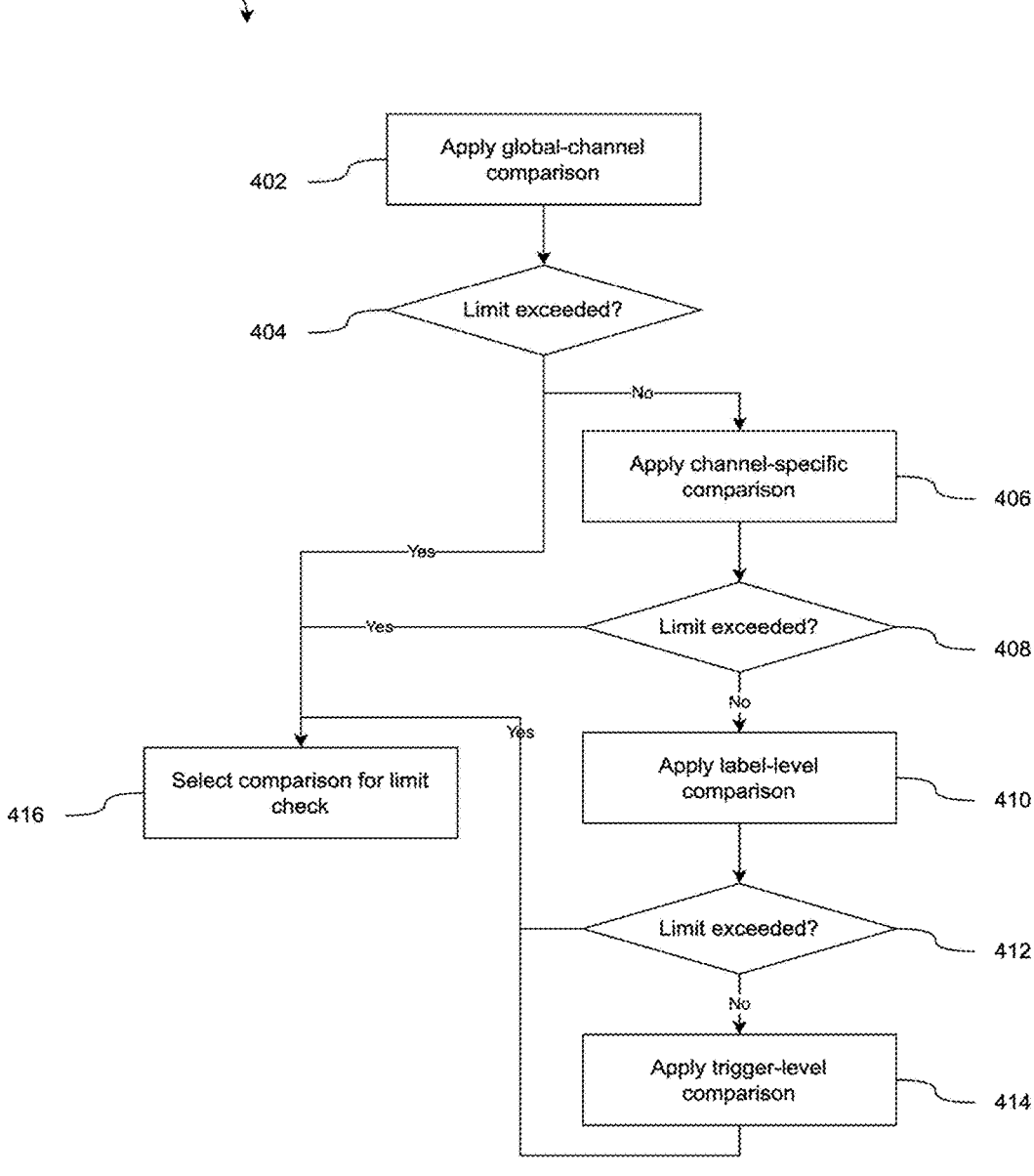
FIG. 4 presents a flowchart for a hierarchical comparison process in a frequency capping system, demonstrating the different levels of comparison applied.

FIG. 4 illustrates a flowchart for a hierarchical comparison process in a frequency capping system. The process may begin with a global-channel comparison (step 402). If a limit is exceeded, the process may move to selecting a comparison for limit check (step 416). If not, a channel-specific comparison may be applied (step 406). This pattern may continue with label-level comparison (step 410) and trigger-level comparison (step 414), with each step potentially leading to the selection of a comparison for limit check if a limit is exceeded.

Figure 5:
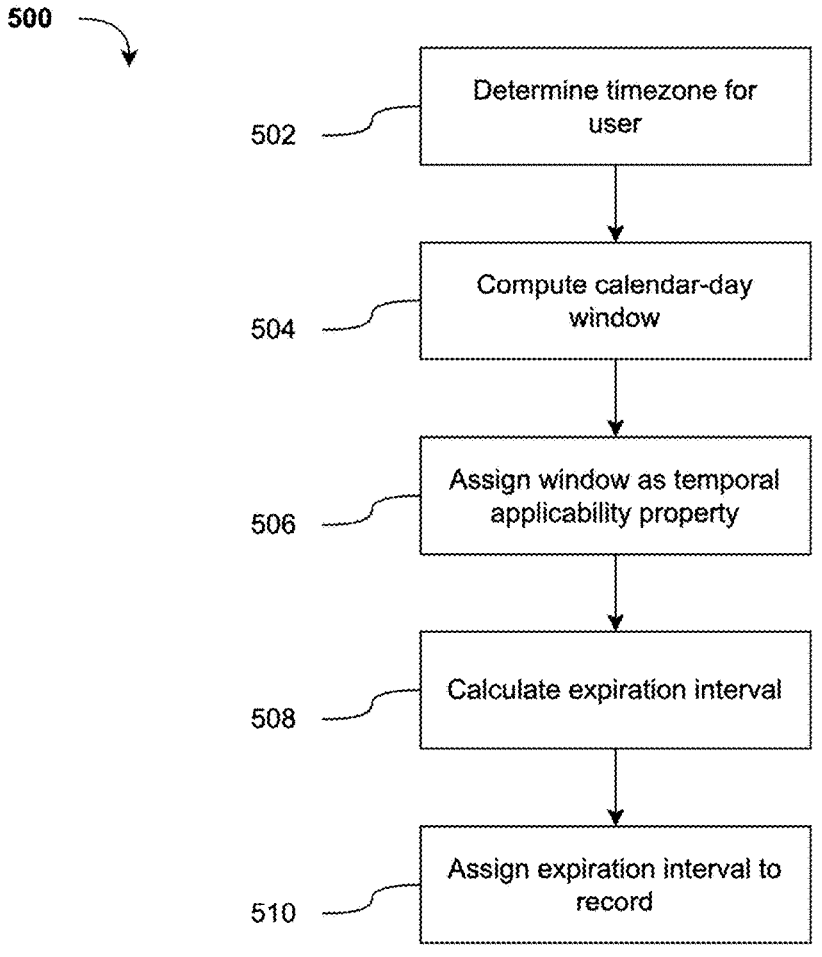
FIG. 5 illustrates a flowchart of a method for managing temporal applicability of user engagement records, including timezone considerations and expiration interval calculations.

FIG. 5 depicts a flowchart of a method for managing temporal applicability of user engagement records. The method may begin by determining a timezone for a user (step 502), followed by computing a calendar-day window based on the timezone (step 504). The method may then assign the calendar-day window as a temporal applicability property (step 506), calculate an expiration interval (step 508), and assign the calculated expiration interval to a record (step 510).

Figure 6:
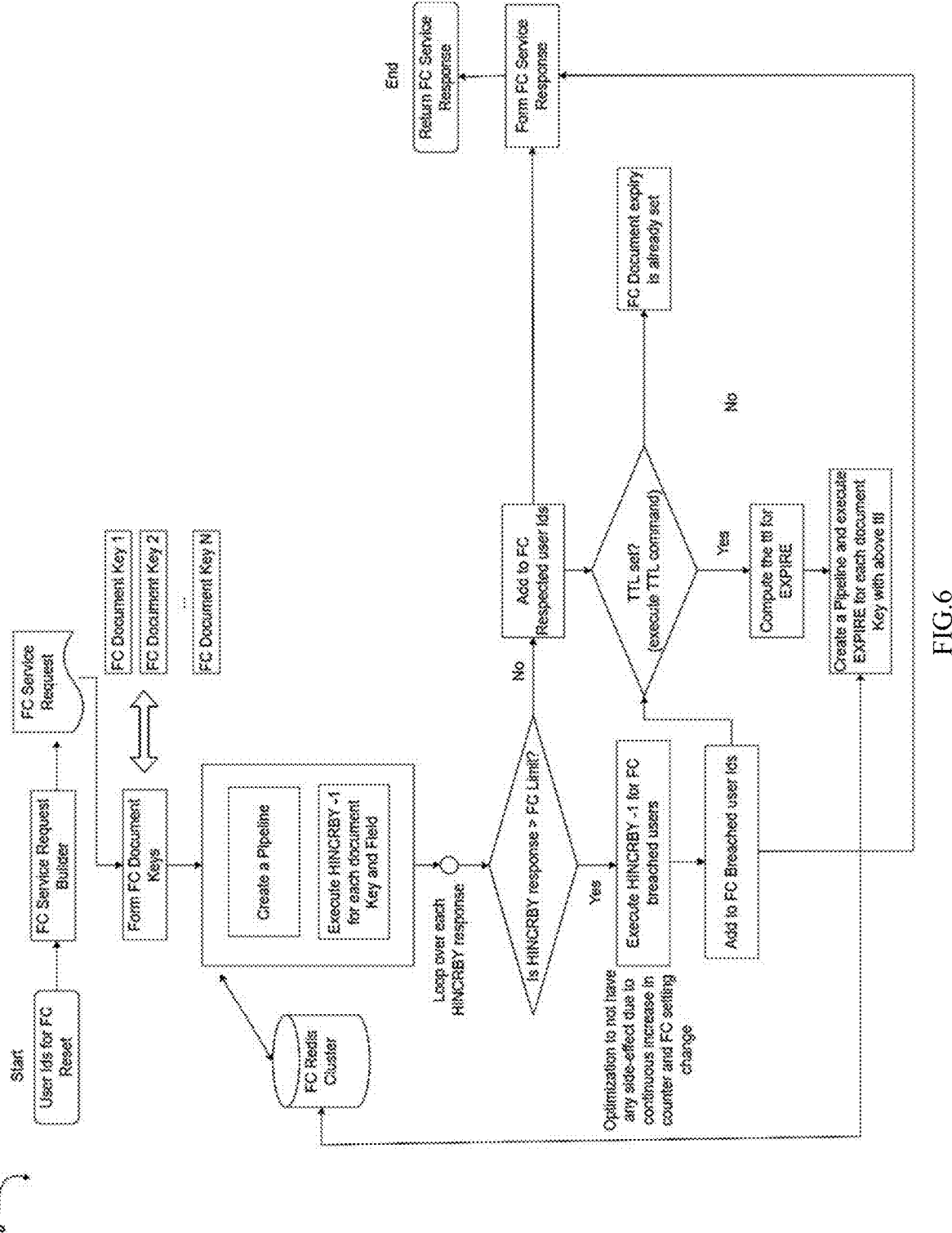
FIG. 6 depicts an exemplary flowchart of a frequency capping process, showing the interaction with a Redis Cluster and the handling of various user IDs.

FIG. 6 illustrates an embodiment of a flow diagram 600 representing the operational workflow of the Frequency Capping Service for regulating message delivery to users based on configurable client-defined limits. This figure captures the sequential interaction between system components and decision logic used to determine whether a message should be delivered or suppressed for a given user.

The process begins when a list of user identifiers is passed to the Frequency Capping (FC) Check process. The FC Service Request Builder forms a structured service request comprising relevant user identifiers, campaign parameters, and engagement constraints. Based on this service request, the system generates a set of FC Document Keys, each of which uniquely represents a user-context engagement record stored in a Redis Cluster.

A Redis Pipeline is created for efficient batch processing. The system executes atomic HINCRBY (Hash Increment By) operations for each document key and its associated hash field (which corresponds to a specific rule or metric). The responses from these commands are collected and evaluated for each user.

For each response, the system checks whether the incremented counter exceeds the configured FC Limit. If not, the user is added to the FC Respected User IDs list, indicating that they are eligible to receive the communication. If the counter exceeds the limit, the system performs a rollback by executing HINCRBY-1 for the affected user—ensuring that counters do not incorrectly reflect a message delivery. These users are recorded in the FC Breached User IDs list.

Following this, the system determines whether an expiry (TTL) must be set for the engagement document. If the document is newly created or lacks a TTL, the system computes the remaining time-to-live (TTL) value based on the user's timezone and calendar interval. It then executes EXPIRE commands using a Redis pipeline to ensure consistent cleanup and recycling of user state data after the applicable calendar window.

Finally, the FC Respected and Breached User ID lists are combined to form the FC Service Response, which is returned to the caller. This allows the client application to either proceed with or suppress the delivery of messages in accordance with engagement rules configured for each user.

This flow ensures high-throughput, low-latency decisioning with atomic operations and minimal side effects, providing a scalable and efficient enforcement mechanism for regulating user engagement in real time.

Figure 7:
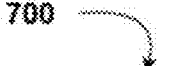
FIG. 7 shows an exemplary process flow for resetting frequency capping counters, illustrating the steps involved in correcting engagement counters in scenarios such as delivery failure or campaign rollback.
Figure 7:
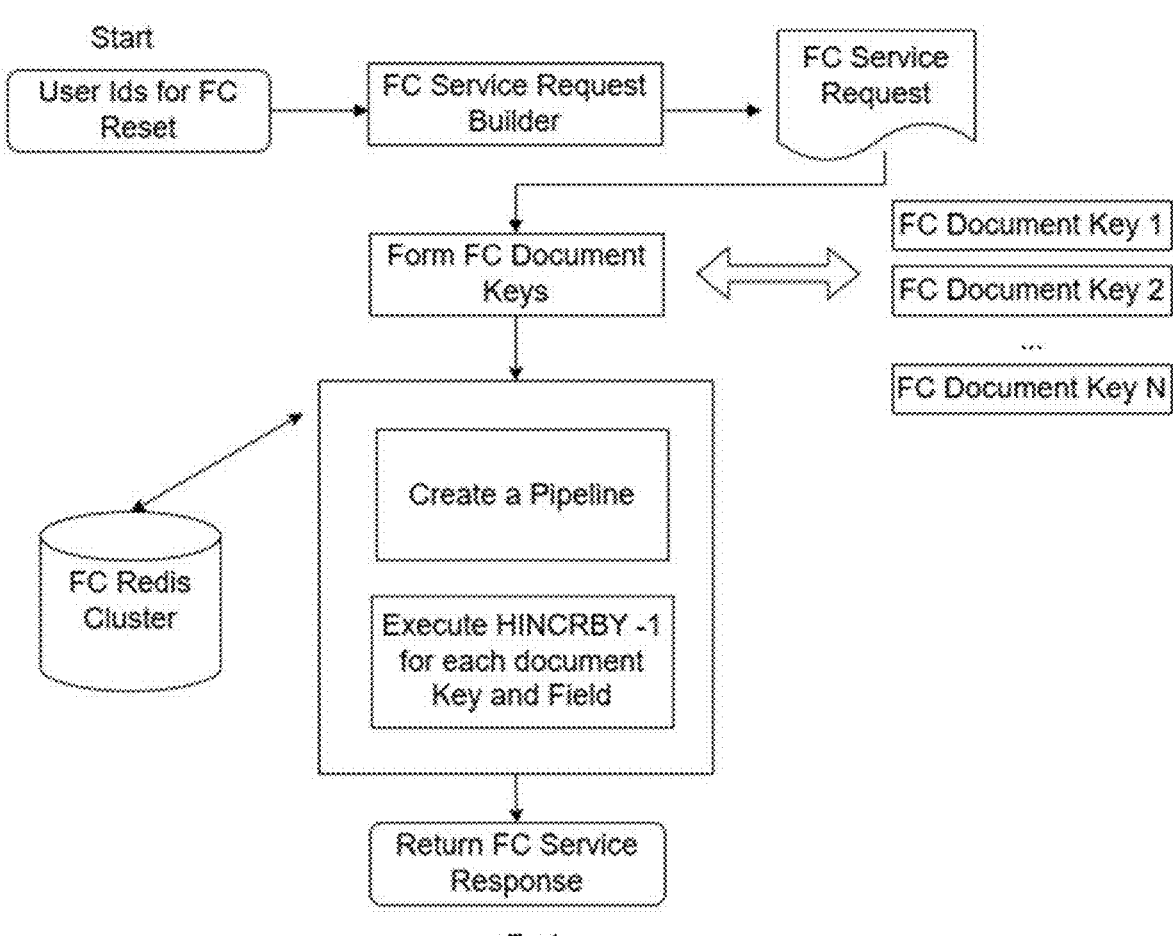

FIG. 7 illustrates an embodiment of a process flow 700 for resetting frequency capping (FC) counters for one or more users in a User Engagement Regulation System. This operation is triggered in scenarios such as delivery failure, campaign rollback, or the need to correct previously incremented engagement counters.

The process begins with a list of user identifiers whose frequency capping records need to be reset. These identifiers are passed into the FC Service Request Builder, which constructs a structured request payload, forming the FC Service Request.

From the service request, a series of FC Document Keys are generated. Each document key uniquely identifies an engagement counter document stored in the FC Redis Cluster for a specific user-context combination.

A Redis Pipeline is then instantiated for efficient batch processing. For each document key and its corresponding hash field (representing a specific rule or metric), the pipeline schedules a HINCRBY−1 command. This operation atomically decrements the engagement counter, effectively reversing a previous increment (e.g., in cases where a message was not delivered but the counter had been incremented).

Once all decrement commands are prepared, the pipeline executes them in bulk against the Redis data store. The results of these operations are compiled to form the FC Service Response, which indicates the completion status of the reset procedure for each user.

This reset mechanism ensures that the engagement state of users remains accurate and prevents over-suppression or misrepresentation of engagement limits due to transient failures. By using atomic Redis operations within a pipeline, the system ensures data integrity, performance, and consistency even under high concurrency.

Exemplary embodiments discussed above may provide certain advantages. Though not required to practice aspects of the disclosure, these advantages may include those provided by following features.

Some embodiments of the system and the method reduce redundant notification delivery by enforcing configurable frequency capping rules, ensuring that users do not receive excessive outbound communications, which in turn improves user satisfaction and engagement.

Some embodiments of the system and the method enable atomic and race-condition-free updates to engagement counters by leveraging execution pipelines and atomic increment operations within an in-memory database, thereby ensuring data consistency and correctness in high-concurrency environments.

Some embodiments of the system and the method achieve significant memory savings by representing user engagement data using compact hash-based data structures within the in-memory database, as opposed to conventional flat string key-value pairs, resulting in substantial reductions in memory usage, such as an observed 41% improvement in certain configurations.

Some embodiments of the system and the method provide real-time responsiveness and scalability by enabling engagement rule evaluation and counter updates in a low-latency, in-memory data store, which is especially beneficial when serving millions of users across concurrent campaigns.

Some embodiments of the system and the method support campaign-level customization by allowing clients to configure label-, channel-, and trigger-specific limits, which enables fine-grained control over user communication strategies across different campaign.

Some embodiments of the system and the method offer rollback mechanisms in case of message delivery failures, where engagement counters are automatically decremented to maintain fairness and avoid unnecessary suppression of future campaigns.

Some embodiments of the system and the method improve operational efficiency by minimizing interactions with the in-memory database through optimized execution pipelines, avoiding repeated evaluations for user identifiers that have already breached engagement limits, and reusing existing engagement-counter records whenever possible. This design reduces computational overhead, network latency, and resource utilization, thereby supporting scalable and responsive performance even in high-throughput environments involving millions of concurrent user interactions.

Although implementations for methods and system for regulating delivery frequency of outbound communications have been described in language specific to structural features and/or methods, it is to be understood that the appended claims are not necessarily limited to the specific features or methods described. Rather, the specific features and methods are disclosed as examples of implementations for regulating delivery frequency of outbound communications.

The invention claimed is:

1. A computer-implemented method for hierarchical notification delivery using an in-memory database optimized for high-concurrency operations, the method comprising:

receiving, by at least one processor, message context data comprising one or more of a user identifier, a client identifier, a campaign identifier, a channel identifier, a label identifier, and a trigger identifier;

deriving, by the at least one processor, (i) a hash key based on the user identifier, the client identifier, and the channel identifier and (ii) a counter-field identifier that encodes the label identifier, the trigger identifier, the campaign identifier, and a temporal-interval indicator;

when the hash key is absent from the in-memory database, creating an engagement-counter record keyed by the hash key and initializing a counter field identified by the counter-field identifier within the engagement-counter record;

incrementing, by an atomic operation directed to the in-memory database, a value stored in the counter field;

comparing the value with a limit stored in a rule set;

outputting an allow signal when the value does not exceed the limit and outputting a suppress signal when the value exceeds the limit; and updating the engagement-counter record in the in-memory database to reflect the incremented value or, when the suppress signal is output, a rolled-back value.

2. The method of claim 1, further comprising: prior to the incrementing, applying global-channel comparison, channel-specific comparison, label-level comparison, and trigger-level comparison in descending order of breadth, and selecting, as the comparison used for the comparing, a comparison at which the limit is exceeded.

3. The method of claim 1, further comprising:

determining a timezone associated with the user identifier;

computing a calendar-day window based on the timezone;

assigning the calendar-day window as a temporal applicability property of the hash key corresponding to the engagement-counter record; and assigning an expiration interval to the engagement-counter record equal to a duration between a system time and the end of the calendar-day window in the timezone.

4. The method of claim 1, wherein the in-memory database is a Redis data store and the incrementing comprises adding one to the value stored in the counter field by executing an atomic hash-field increment operation within a Redis pipeline that batches multiple operations into a single network round trip, thereby avoiding race conditions during concurrent requests.

5. The method of claim 1, wherein the in-memory database implements a hash data structure in which each counter field is a hash field and each engagement-counter record is a hash key.

6. The method of claim 1, further comprising decrementing the value stored in the counter field upon receipt of a delivery-failure notification associated with the message context data.

7. The method of claim 1, wherein receiving the message context data further comprising retrieving, from the in-memory database, the engagement-counter record keyed by the user identifier, the client identifier, and the channel identifier.

8. The method of claim 1, further comprising adjusting the limit responsive to receipt of a rule-update request and applying the adjusted limit during the retrieval of the engagement-counter record following the rule-update request.

9. A system for hierarchical notification delivery using an in-memory database optimized for high-concurrency operations, the system comprising:

a communication interface configured to receive message-context data comprising a user identifier, a client identifier, a campaign identifier, a channel identifier, a label identifier, and a trigger identifier;

an in-memory database that stores engagement-counter records as hash structures addressable by hash keys;

a rule store that maintains frequency-capping limits associated with counter-field identifiers; and at least one processor coupled to a memory that stores executable instructions which, when executed by the at least one processor, cause the system to:

derive a hash key from the user identifier, the client identifier, and the channel identifier;

derive a counter-field identifier that encodes the label identifier, the trigger identifier, the campaign identifier, and a temporal-interval indicator;

when the hash key is absent from the in-memory database, create an engagement-counter record keyed by the hash key and initialize a counter field identified by the counter-field identifier within the engagement-counter record;

atomically increment a value stored in the counter field within the in-memory database;

retrieve, from the rule store, a limit associated with the counter-field identifier and compare the incremented value with the limit;

output an allow signal when the incremented value does not exceed the limit and output a suppress signal when the incremented value exceeds the limit; and update the engagement-counter record in the in-memory database to reflect the incremented value or, when the suppress signal is output, a rolled-back value.

10. The system of claim 9, wherein the instructions, when executed by the at least one processor, further cause the system to:

prior to the incrementing the value, the processor applies a global-channel comparison, channel-specific comparison, label-level comparison, and trigger-level comparison in descending order of breadth, and select, as the comparison used for the comparing, a comparison at which the limit is exceeded.

11. The system of claim 9, wherein the instructions, when executed by the at least one processor, further cause the system to:

determine a timezone associated with the user identifier;

compute a calendar-day window based on the timezone;

assign the calendar-day window as a temporal applicability property of the hash key corresponding to the engagement-counter record; and assign an expiration interval to the engagement-counter record equal to a duration between a system time and the end of the calendar-day window in the timezone.

12. The system of claim 9, wherein the in-memory database is a Redis data store and the incrementing comprises adding one to the value stored in the counter field by executing an atomic hash-field increment operation within a Redis pipeline that batches multiple operations into a single network round trip, thereby avoiding race conditions during concurrent requests.

13. The system of claim 9, wherein the in-memory database implements a hash data structure in which each counter field is a hash field and each engagement-counter record is a hash key.

14. The system of claim 9, wherein the instructions, when executed by the at least one processor, further cause the system to: decrement the value stored in the counter field upon receipt of a delivery-failure notification associated with the message context data.

15. The system of claim 9, wherein receiving the message context data further comprises retrieving, from the in-memory database, the engagement-counter record keyed by the user identifier, the client identifier, and the channel identifier.

16. The system of claim 9, wherein the instructions, when executed by the at least one processor, further cause the system to:

adjust the limit responsive to receipt of a rule-update request; and apply the adjusted limit during the retrieval of the engagement-counter record following the rule-update request.

* * * * *